Jan. 4, 1949.  A. J. THOMPSON  2,458,224
MACHINE FOR PNEUMATICALLY SEPARATING
POTATOES FROM ROCKS
Filed Oct. 11, 1945  3 Sheets-Sheet 2

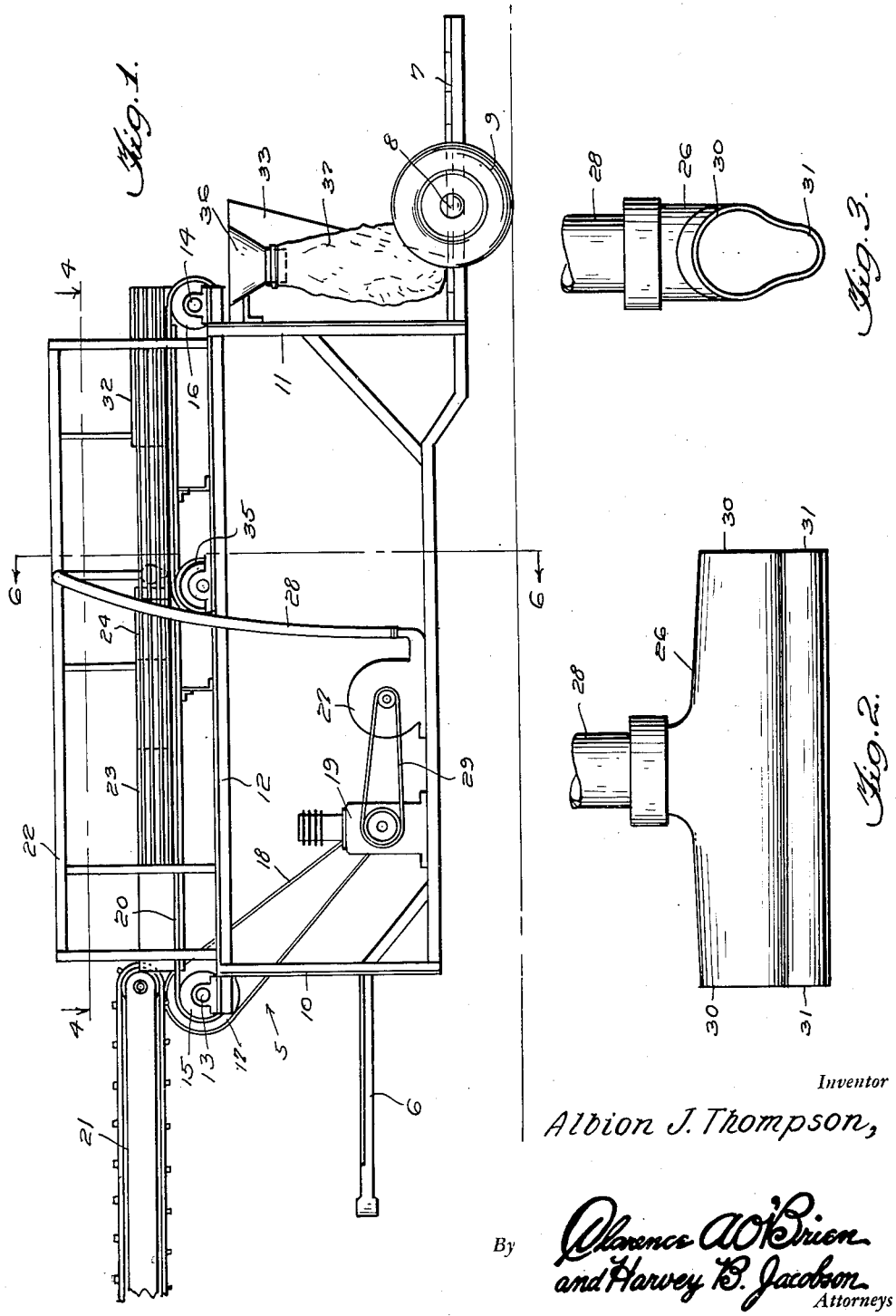

Inventor
Albion J. Thompson,

By Clarence A. O'Brien
and Harvey B. Jacobson
Attorneys

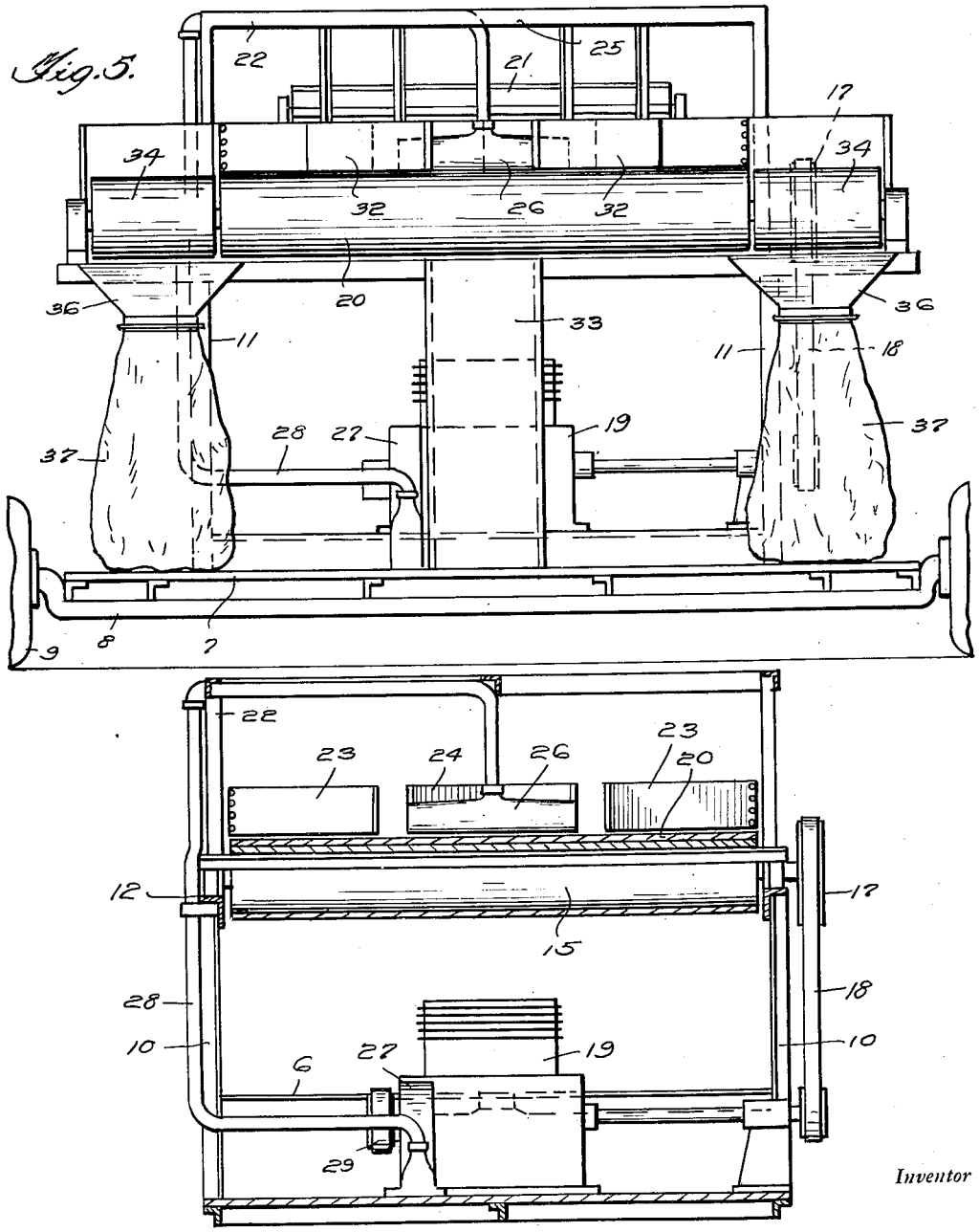

Patented Jan. 4, 1949

2,458,224

UNITED STATES PATENT OFFICE 2,458,224

MACHINE FOR PNEUMATICALLY SEPARATING POTATOES FROM ROCKS

Albion J. Thompson, Washburn, Maine, assignor of fifty per cent to Abram Crouse, Crouseville, Maine Application October 11, 1945, Serial No. 621,773

2 Claims. (Cl. 209—470)

The present invention relates to new and useful improvements in means for pneumatically separating potatoes from rocks and more particularly to an attachment adapted to be drawn behind a picking machine for separating potatoes before the bagging or crating thereof from rocks and like objects.

A further object of the invention is to provide a separating device of this character adapted for operatively mounting behind a conventional form of potato picking machine to be drawn over the field by the potato picker and without necessitating any changes or alterations in the construction of the picking machine.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed. reference being had to the accompanying drawings forming part hereof, wherein like numerals refer to like parts throughout, and in which:

Figure 1 is a side elevational view.

Figure 2 is an enlarged side elevational view of the blower nozzle.

Figure 3 is an end elevational view thereof.

Figure 5 is a rear elevational view, and

Figure 6 is a vertical transverse sectional view taken substantially on a line 6—6 of Figure 1.

Figure 4:
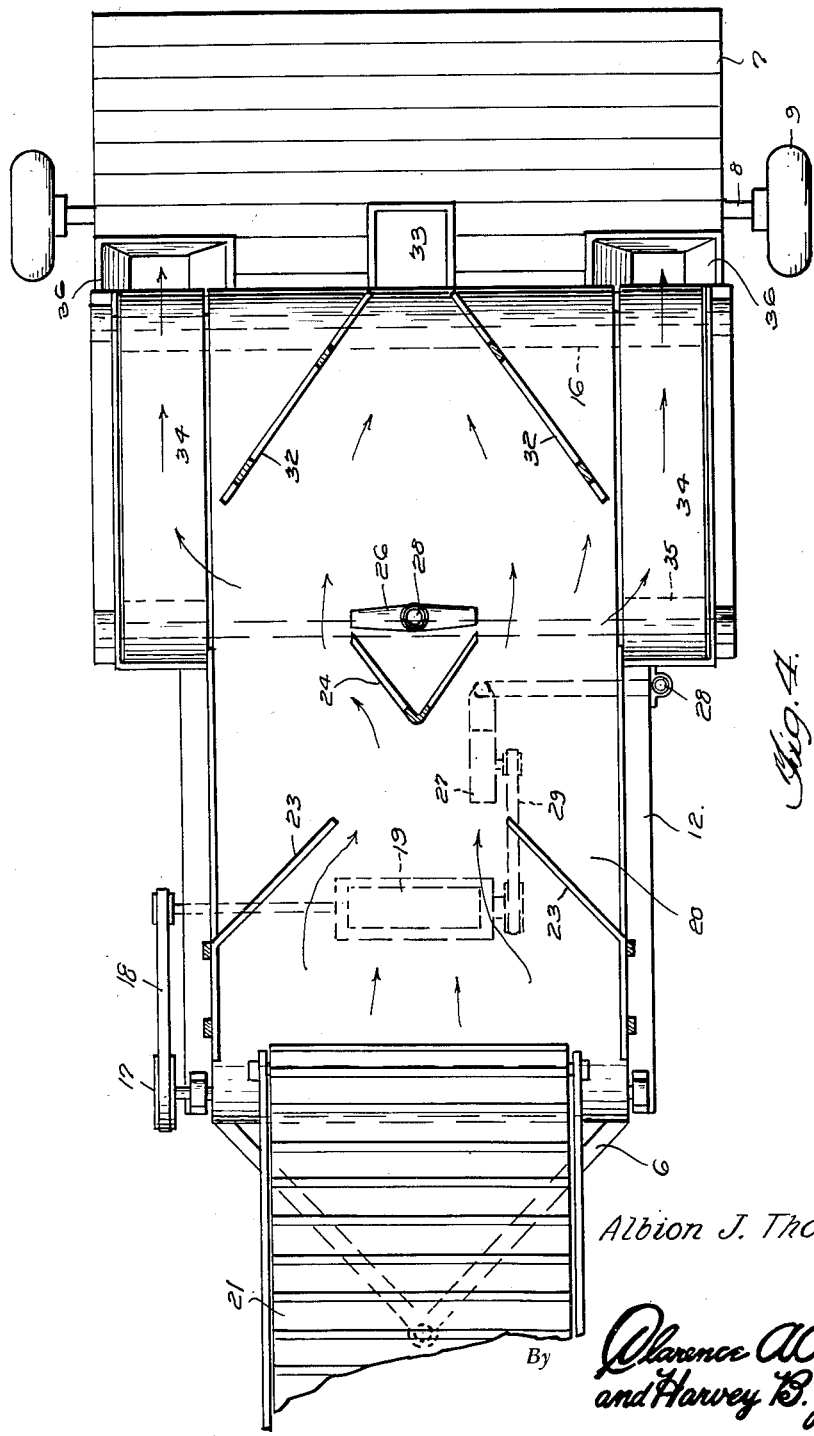
Figure 4 is a horizontal sectional view taken substantially on a line 4—4 of Figure 1.

Referring now to the drawings in detail wherein for the purpose of illustration I have disclosed a preferred embodiment of the invention, the numeral 5 designates a trailer frame or body having a tow pole or tongue 6 extending forwardly at its front end and adapted for connection with a conventional form of potato picking machine for drawing the trailer over a field. the rear end of the body or frame 5 being provided with a platform 7 supported on an axle 8 and on which the rear wheels 9 are mounted to thus provide a two-wheeled trailer.

Front and rear posts 10 and 11 rise from the corners of the body or frame 5 and on the upper ends of which are supported a conveyor frame structure 12.

Front and rear shafts 13 and 14 are journaled transversely on the conveyor frame 12 and to which front and rear rollers 15 and 16 are respectively connected. A pulley 17 is also secured to one end of the front shaft 13 for driving the front roller 15 by means of a belt 18 from a conventional form of power plant 19 mounted on the body or frame 5.

An endless conveyor belt 20 of rubber or other suitable material is mounted to travel on the rollers 15 and 16, the front end of the conveyor belt projecting under the rear discharge end of a conveyor 21 carried by a conventional form of potato picking machine (not shown).

The conveyor frame 12 includes side rails 22 supported thereon and which serves as a brace for a pair of front baffles 23 which project inwardly from the side rails 22 and are inclined rearwardly in overlying relation with respect to the upper flight of the belt 20. The inner ends of the baffles 23 are spaced apart from each other at the center of the belt to provide a restricted passage for the potatoes, rocks and other objects deposited onto the belt by the conveyor 21.

A V-shaped baffle 24 is supported at the center of the upper flight of the belt 20 above the belt and rearwardly of the inner ends of the baffles 23 by means of a transverse frame member 25 carried by the rails 22, the baffle 24 having its closed ends extending forwardly to deflect potatoes and other objects toward the side of the conveyor belt 20 after passing through the baffles 23.

A double-ended blower nozzle 26 is supported above the upper flight of the conveyor belt 20 immediately behind the baffle 24, the nozzle having its discharge ends opening in a direction transversely of the conveyor belt 20 to subject the potatoes, rocks and other objects passing along the conveyor belt rearwardly of the baffle 24 to a blast of air from a blower 27 connected to the nozzle by means of a hose 28. The blower 27 is driven from the power plant 19 by means of a belt 29.

The nozzle 26 is of substantially inverted pear-shape in cross section as shown more clearly in Figure 3 of the drawings to provide a relatively wide discharge mouth 30 at its upper portion and a relatively narrow discharge mouth 31 at its lower portion.

Behind the nozzle 26 above the upper flight of the conveyor belt 20 is positioned a pair of baffles 32 which converge inwardly at their rear ends toward a chute 33 under the rear end of the conveyor belt 20 and extending downwardly through the platform 7.

At each side of the conveyor belt 20, at its rear end, is mounted a pair of conveyor belts 34, the rear end of the belt 34 being mounted on the rear roller 16 and the front end of the conveyor belt 34 being mounted on rollers 35 journaled on the frame 12. Hoppers 36 are supported by the rear post 11 immediately behind the conveyor belt 34 and to which bags 37 may be attached for bagging the potatoes discharged from the conveyor. The baffles 23, 24 and 32 may be constructed of slats as illustrated more clearly in Figure 1 of the drawings, or may embody any other suitable construction.

In the operation of the device, potatoes, rocks and other objects are delivered onto the front end of the conveyor belt 20 by the conveyor 21 of the potato digging machine as the machine travels over the field and the potatoes and other objects are then deflected toward the center of the belt 20 by the baffles 23. The baffle 24 is positioned in the path of the rearwardly traveling potatoes and other objects which then deflect the potatoes and objects toward the sides of the belt and to cause the potatoes and other objects to travel across the laterally directed openings at the opposite ends of the nozzle 26 immediately behind the rear end of the baffle 24. The potatoes being lighter than the stones or other heavy objects will be rolled toward the opposite sides of the conveyor belt 20 onto the side conveyor belt 34 for subsequent delivery into the hoppers 36 and bags 37.

The stones and other heavy objects will be unaffected by the blast of air from the nozzle 26 and accordingly will continue their rearward travel for engagement by the baffles 32 which direct the same into the chute 33 and to thus discharge the stones to the ground.

Workmen are adapted to stand on the platform 7 to remove the bags 37 after being filled and to replace the same.

The relatively narrow mouth 31 at the ends of the nozzle 26 limits the force of air directed against the stones and other heavy objects which are usually smaller than the potatoes and lie flatly on the conveyor belt 20 to thus prevent the rolling of the stones onto the side conveyor 24.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

What is claimed is:

1. A separator for relatively light and heavy objects and comprising an endless moving belt adapted to receive the objects, baffles supported above the belt to guide the objects toward the center of the belt, a double-ended nozzle supported above the belt and having its discharge openings directed toward opposite sides of the belt, fluid pressure means connected to the nozzle, a baffle in advance of the nozzle and constructed to guide the objects in the path of said discharge openings whereby the light objects will be moved laterally toward opposite sides of the belt without causing lateral movement of the heavy objects, conveyor belts at the sides of said first-named belt arranged for receiving the light objects, hoppers at the delivery ends of said last-named belts, and a chute at the delivery end of the first-named belt.

2. A separator for relatively light and heavy objects comprising an endless horizontal belt for conveying the objects, means at one end of said belt for deflecting the objects as the same are conveyed toward the lonigtudinal center of said belt to concentrate the same in a path substantially narrower than said belt, means in the center of the belt for deflecting said objects from said path toward both sides of said belt, means for subjecting the articles deflected from said path to air blast directed toward both sides of said belt, and means at the other end of said belt for guiding the articles deflected and subjected to such air blast back into said path as the same are conveyed.

ALBION J. THOMPSON.

REFERENCES CITED

The following references are of record in the file of this patent:

UNITED STATES PATENTS

| Number | Name | Date |
|---|---|---|
| 253,771 | Sebillot | Feb. 14, 1882 |
| 1,192,159 | Blauvelt | July 25, 1916 |
| 1,318,881 | Kelley | Oct. 14, 1919 |
| 1,569,038 | Schmechel | Jan. 12, 1926 |
| 1,751,391 | Bunker | Mar. 18, 1930 |
| 1,878,099 | Bost | Sept. 20, 1922 |
| 2,014,708 | Vawter | Sept. 17, 1935 |
| 2,062,211 | Davis | Nov. 24, 1936 |
| 2,095,428 | Batie | Oct. 12, 1937 |